(12) United States Patent
Yamaguchi et al.

(10) Patent No.: US 9,656,643 B2
(45) Date of Patent: May 23, 2017

(54) RETARDING DEVICE USING A FLUID

(71) Applicant: NIPPON STEEL & SUMITOMO METAL CORPORATION, Tokyo (JP)

(72) Inventors: Hiroyuki Yamaguchi, Tokyo (JP); Hiroshi Nogami, Tokyo (JP); Kenji Imanishi, Tokyo (JP); Takashi Futaba, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 14/412,738

(22) PCT Filed: Aug. 13, 2013

(86) PCT No.: PCT/JP2013/071853
§ 371 (c)(1),
(2) Date: Jan. 5, 2015

(87) PCT Pub. No.: WO2014/027653
PCT Pub. Date: Feb. 20, 2014

(65) Prior Publication Data
US 2015/0323023 A1 Nov. 12, 2015

(30) Foreign Application Priority Data

Aug. 13, 2012 (JP) ................................ 2012-179320

(51) Int. Cl.
*B60T 10/02* (2006.01)
*F16D 66/00* (2006.01)
(Continued)

(52) U.S. Cl.
CPC ............ *B60T 10/02* (2013.01); *B60T 13/585* (2013.01); *F16D 57/02* (2013.01); *F16D 65/12* (2013.01);
(Continued)

(58) Field of Classification Search
CPC ........ B60T 10/02; B60T 13/585; F16D 65/84; F16D 65/853; F16D 57/00; F16D 57/02
(Continued)

(56) References Cited

U.S. PATENT DOCUMENTS 2,126,751 A 8/1938 De La Mater
3,448,832 A 6/1969 Winkler
(Continued)

FOREIGN PATENT DOCUMENTS

CN 1914077 2/2007
CN 2906200 5/2007
(Continued)

OTHER PUBLICATIONS

Chinese Office Action for Application No. 201380039135.2, dated Mar. 23, 2016.
(Continued)

*Primary Examiner* — Melanie Torres Williams
(74) *Attorney, Agent, or Firm* — Clark & Brody

(57) ABSTRACT

This fluid-type retarding device includes: a rotating disk provided to a rotating shaft; a rotating housing that includes paired disk portions and a cylinder portion connecting outer circumferential portions of the disk portions so as to surround the rotating disk, and is rotatably supported with the rotating shaft; and a friction brake that presses a friction member against the rotating housing at the time of braking to bring the rotating housing to a stop. On at least one surface of the rotating disk, a disk vane extending from an inner circumference of the surface toward an outer peripheral side is formed, and on an inner surface of each of the paired disk portions corresponding to the disk vane, a housing vane extending from an inner circumference to an outer periphery is formed. Furthermore, working fluid is accommodated within the rotating housing.

8 Claims, 10 Drawing Sheets

(51) Int. Cl.
*F16D 65/84* (2006.01)
*F16D 57/02* (2006.01)
*B60T 13/58* (2006.01)
*F16D 65/12* (2006.01)
*H02K 49/04* (2006.01)
*F16D 121/02* (2012.01)
*F16D 123/00* (2012.01)
*H02K 9/19* (2006.01)

(52) U.S. Cl.
CPC ............ *F16D 65/84* (2013.01); *F16D 66/00* (2013.01); *H02K 49/046* (2013.01); *F16D 2066/001* (2013.01); *F16D 2121/02* (2013.01); *F16D 2123/00* (2013.01); *H02K 9/19* (2013.01)

(58) Field of Classification Search
USPC .................................................. 188/296, 71.5
See application file for complete search history.

(56) References Cited

U.S. PATENT DOCUMENTS

| | | | |
|---|---|---|---|
| 4,194,600 | A | 3/1980 | Armasow et al. |
| 2008/0035440 | A1 | 2/2008 | Hoeller |

FOREIGN PATENT DOCUMENTS

| | | | | |
|---|---|---|---|---|
| CN | 102401046 | | 4/2012 | |
| CN | 102494056 | | 6/2012 | |
| DE | GB 1273185 | A * | 5/1972 | ............ B61H 5/00 |
| GB | 1139534 | | 1/1969 | |
| GB | 1211629 | | 11/1970 | |
| JP | 57-157834 | | 9/1982 | |
| JP | 61-286627 | | 12/1986 | |
| JP | 61-290242 | | 12/1986 | |
| JP | 01-153825 | | 6/1989 | |
| JP | 01-234043 | | 9/1989 | |
| JP | 01-298948 | | 12/1989 | |
| JP | 05-340434 | | 12/1993 | |
| JP | 08-175345 | | 7/1996 | |
| JP | 2002-051533 | | 2/2002 | |
| JP | 2002-087222 | | 3/2002 | |
| JP | 2011-097696 | | 5/2011 | |
| KR | 10-2008-0009442 | | 1/2008 | |
| KR | 10-2009-0078897 | | 7/2009 | |
| WO | 2006/027056 | | 3/2006 | |

OTHER PUBLICATIONS

Extended European Search Report for Application No. 13879414.4, dated Apr. 12, 2016.

Office Action for Application No. KR 10-2015-7001501, Mailed Aug. 30, 2016, with it's English translation.

* cited by examiner

RETARDING DEVICE USING A FLUID

TECHNICAL FIELD

The present invention relates to a fluid-type retarding device mounted as an auxiliary brake in means of transportation including vehicles such as trucks and buses.

The present application claims priority based on Japanese Patent Application No. 2012-179320 filed in Japan on Aug. 13, 2012, the content of which is incorporated herein by reference.

BACKGROUND ART

In general, auxiliary brakes for use in vehicles include a fluid-type retarding device and an eddy-current retarding device.

As disclosed, for example, in Patent Documents 1 and 2, the fluid-type retarding device includes paired impellers as used in a fluid coupling, which are disposed so as to face each other within a working container connected to the rear end of a transmission.

The paired impellers disclosed in Patent Documents 1 and 2 each include radially extending vanes, one of which is a fixed impeller fixed to the working container and serving as a stator, and the other one of which is a rotating impeller serving as a rotor and fixed directly with the output shaft (rotating shaft) of the transmission or fixed through a speed-increasing gear mechanism. The fixed impeller and the rotating impeller form a torus-shaped working chamber.

In the configuration described above, at the time of braking, the working chamber is supplied and filled with working fluid (oil, water, or mixture thereof) through oil-hydraulic pressure or air pressure. Then, the rotating impeller is rotating, while the fixed impeller is at rest. Thus, a difference in relative rotational speed takes place between these impellers, and the working fluid circulates between the rotating impeller and the fixed impeller within the working chamber, thereby causing circulatory flow of the working fluid. At this time, the working fluid functions as a resistance that prevents the rotating impeller from rotating. This leads to a generation of braking force acting on the rotating impeller, whereby it is possible to reduce the speed of rotation of the rotating shaft through the rotating impeller.

At this time, kinetic energy of the rotating shaft is converted into thermal energy in association with the generation of braking force, whereby temperatures of the working fluid increase to be a high temperature. Thus, it is necessary for the fluid-type retarding device disclosed in Patent Document 1 to have an external cooling system that discharges the working fluid, which has high temperatures, into the outside of the working container, thereby cooling it with a heat exchanger.

In the case of this retarding device, although high braking force can be stably generated for a long period of time, a device for supplying and discharging the working fluid as well as the heat exchanger are required in addition to the paired impellers that directly contribute to the generation of braking force, so that the device configuration is complicated, and the weight of the device itself increases. Furthermore, even if it is possible to use the cooling water system that the vehicle originally has, significant modifications are necessary for the vehicle. Thus, this retarding device is not suitable for small to mid-sized vehicles, which have relatively reduced vehicle weight and for which compact and simple assembly is desired.

On the other hand, a fluid-type retarding device disclosed in Patent Document 2 employs an internal cooling system in which a ring-shaped heat exchanger is provided radially outside of the working chamber, and a fan driven by electricity or the pressure of the working fluid is attached to a rotating shaft. With this internal cooling system, the working fluid, which has high temperatures, is guided to the ring-shaped heat exchanger, and the working fluid is air cooled by air blow from the fan. In the case of this retarding device, the external heat exchanger is not necessary, and pipes for connecting with this external heat exchanger can be omitted. Furthermore, this retarding device is separated from the cooling water system of the vehicle, thereby exhibiting excellent assembly properties.

However, as with Patent Document 1, with the fluid-type retarding device disclosed in Patent Document 2, it is necessary to discharge the working fluid from the working chamber during non-braking periods, and supply the working fluid to the working chamber at the time of braking. Thus, it is essential to provide a special mechanism such as a pneumatic system, a hydraulic pump, and a shutoff valve to supply and discharge the working fluid to and from the working chamber, and furthermore, a reservoir container for storing the working fluid is essential. This is a large obstacle to use in small to mid-sized vehicles for which further reductions in the number of parts, weight, and size are desired. Furthermore, it is necessary to supply or discharge the working fluid to or from the working chamber at the time of switching from braking to non-braking and vice versa, and hence, it takes certain time from the non-braking state to obtain a desired braking force or from the braking state to fully become the non-braking state, which inconveniently results in a delay in response.

On the other hand, the eddy-current retarding device includes a brake member connected to a rotating shaft, and causes eddy current on a surface of the brake member facing magnets due to an effect of a magnetic field from permanent magnets or electromagnet at the time of braking. With the eddy current, there occurs braking force in a direction opposite to the rotational direction of the brake member rotating integrally with the rotating shaft, thereby reducing the speed of rotation of the rotating shaft (see, for example, Patent Documents 3 to 6).

In the case of the eddy-current retarding device, with the eddy current generated on the brake member at the time of braking, the kinetic energy of the rotating shaft is converted into thermal energy. With this thermal energy, the brake member is heated, and the heat generated is radiated through fins provided to the brake member, which rotates at high speed.

For these reasons, unlike the fluid-type retarding device, it is not necessary to discharge the working fluid from the working chamber to cool it with the heat exchanger, and the device configuration is simple. In particular, in the case of an eddy-current retarding device employing strong permanent magnets, the permanent magnets have significantly reduced size and reduced weight as compared with the electromagnet that generates the same magnetic force, and hence, it is possible to reduce the weight and the size. Thus, this eddy-current retarding device is promising since it can be applied not only to large-sized vehicles but also to small to mid-sized vehicles.

RELATED ART DOCUMENTS

Patent Document

Patent Document 1: Japanese Unexamined Patent Application, First Publication No. 2002-87222

Patent Document 2: PCT International Publication No. WO2006/027056
Patent Document 3: Japanese Unexamined Patent Application, First Publication No. H1-234043
Patent Document 4: Japanese Unexamined Patent Application, First Publication No. H1-298948
Patent Document 5: Japanese Unexamined Patent Application, First Publication No. 2002-51533
Patent Document 6: Japanese Unexamined Patent Application, First Publication No. 2011-97696

DISCLOSURE OF THE INVENTION

Problems to be Solved by the Invention

However, the permanent magnets having strong magnetic force contain a large amount of rare earth metals such as neodymium, and hence, are extremely expensive. Furthermore, prices thereof largely change due to effects of the balance of supply and demand, and hence, the eddy-current retarding device employing the permanent magnets has a problem in which costs thereof are not stable due to dependence on specifications of the permanent magnets.

Furthermore, in the case of conventional eddy-current retarding devices, it is not necessary to discharge the working fluid from the working chamber to cool it with the heat exchanger. However, a disc brake provided as a friction brake and a brake member that causes braking force to occur with eddy current are disposed in series in order to make them coaxial with the rotating shaft. Thus, it is difficult to reduce the longitudinal size of the rotating shaft along the axial direction.

The present invention has been made in view of the situations described above, and an object of the present invention is to provide a fluid-type retarding device that has a simplified device configuration and has a reduced size along an axial direction of a rotating shaft to be connected thereto, thereby achieving reduced weight and reduced size.

Means for Solving the Problem

Each aspect of the present invention is provided as follows:
(1) An aspect of the present invention provides a fluid-type retarding device including: a rotating disk provided to a rotating shaft; a rotating housing that includes paired disk portions and a cylinder portion connecting outer circumferential portions of the disk portions so as to surround the rotating disk, and is rotatably supported with the rotating shaft; and a friction brake that presses a friction member against the rotating housing at a time of braking to bring the rotating housing to a stop, in which, on at least one surface of the rotating disk, a disk vane extending from an inner circumference of the surface toward an outer peripheral side is formed, on an inner surface of each of the paired disk portions corresponding to the disk vane, a housing vane extending from an inner circumference to an outer periphery is formed, and working fluid is accommodated within the rotating housing.
(2) In the fluid-type retarding device according to (1) described above, the disk vane may be formed on both sides of the rotating disk, and a through-hole may be provided on an inner circumference portion of the rotating disk.
(3) In the fluid-type retarding device according to (2) described above, the disk vane may be formed on both sides of the rotating disk; and an outer peripheral side of the disk vane formed on one surface of the rotating disk may be formed so as to extend toward the rear in a rotational direction of the rotating disk, and an outer peripheral side of the disk vane formed on the other surface may be formed so as to extend toward the front in the rotational direction of the rotating disk.
(4) In the fluid-type retarding device according to any one of (1) to (3) described above, the rotating shaft supporting the rotating housing may have a tubular body having a space accommodating the working fluid therein, and include a communicating hole that allows an internal space of the rotating housing and an internal space of the rotating shaft to communicate with each other.
(5) The fluid-type retarding device according to any one of (1) to (4) described above may further include an impeller provided to the rotating shaft so as to be proximate to an external surface of each of the paired disk portions.
(6) In the fluid-type retarding device according to any one of (1) to (5) described above, the friction brake may include: a brake caliper that is fixed to a non-rotating portion of a vehicle provided with the rotating shaft and includes paired brake pads that each serve as the friction member and squeeze the paired disk portions; and an actuator that drives the brake caliper and moves the paired brake pads toward the disk portions.
(7) The fluid-type retarding device according to (6) described above may further include: a temperature sensor that is brought into contact with an external surface of each of the disk portions in association with movement of the brake pads toward the disk portions, and detects a temperature of each of the disk portions; and an actuator controlling unit that stops actuating the actuator in a case where the temperature of each of the disk portions detected by the temperature sensor exceeds a predetermined temperature.
(8) The fluid-type retarding device according to (6) or (7) described above may further include a cooling member that is brought into contact with an external surface of each of the disk portions in association with movement of the brake pads toward the disk portions.
(9) In the fluid-type retarding device according to any one of (1) to (8) described above, either one of a plurality of permanent magnets and an eddy-current generating member may be formed on at least any one surface of both surfaces and an outer peripheral surface of the rotating disk; an eddy-current generating member may be formed on a surface selected from among inner surfaces of the disk portions and an inner peripheral surface of the cylinder portion, each of which constitutes the rotating housing, this selected surface corresponding to the surface of the rotating disk having the plural permanent magnets formed thereon; plural permanent magnets may be formed on a surface corresponding to the surface of the rotating disk having the eddy-current generating member formed thereon; and the plural permanent magnets may be arranged in a manner such that opposing magnetic poles are alternately arranged in a circumferential direction of the rotating disk.

Effects of the Invention

According to the fluid-type retarding device of the present invention, it is possible to achieve miniaturization by reducing the size in the axial direction of the device.

Furthermore, in the case where the internal space of the rotating housing and the internal space of the rotating shaft are communicated with each other, the external heat exchanger for cooling the working fluid having high temperatures at the time of braking is not necessary, and a mechanism for supplying or discharging the working fluid to or from the working chamber or a reservoir container for storing the working fluid is not necessary. Thus, the device configuration can be simplified, whereby it is possible to further achieve reduced weight and reduced size.

EMBODIMENTS OF THE INVENTION

The present inventors carried out thorough investigations on the assumption that the fluid-type retarding device is employed. As a result, they found that, in order to achieve the object described above, it is effective to employ a friction brake in which:

a disk is connected to a rotating shaft; a housing including paired disk portions and a cylinder portion is rotatably supported with the rotating shaft in a manner that surrounds the entire rotating disk; working fluid is contained in the rotating housing; and a friction member is pressed directly to this rotating housing at the time of braking to bring the rotating housing to a stop, and completed the present invention.

Hereinbelow, each embodiment of a fluid-type retarding device according to the present invention will be described in detail.

First Embodiment

Below, a fluid-type retarding device according to a first embodiment of the present invention will be described with reference to FIG. 1A to FIG. 1E.

Figure 1A:
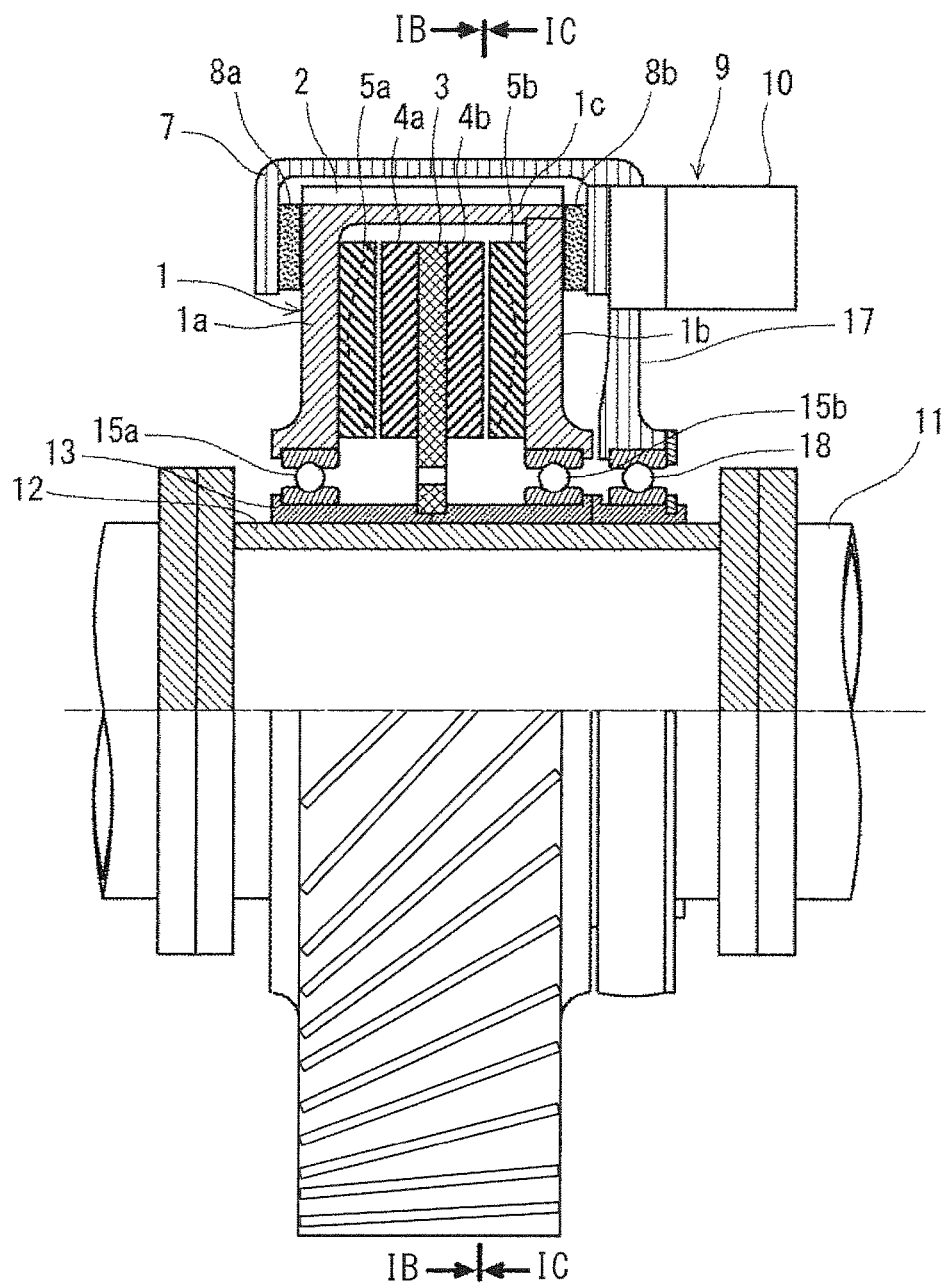
FIG. 1A is a schematic view illustrating the entire configuration of a fluid-type retarding device according to a first embodiment of the present invention, and is a side view in which part of the device is sectionally illustrated.
Figure 1B:
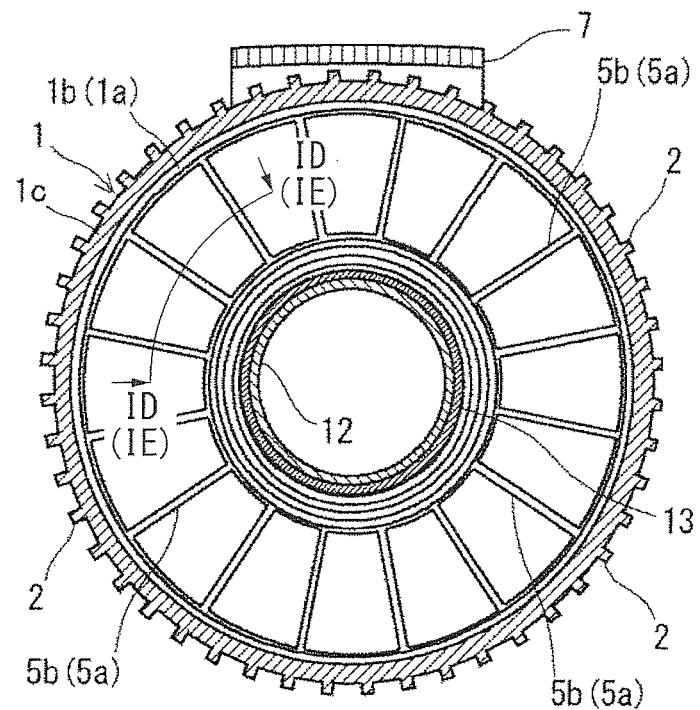
FIG. 1B is a diagram illustrating the same fluid-type retarding device, and is a diagram illustrating a cross section along IB-IB in FIG. 1A.
Figure 1C:
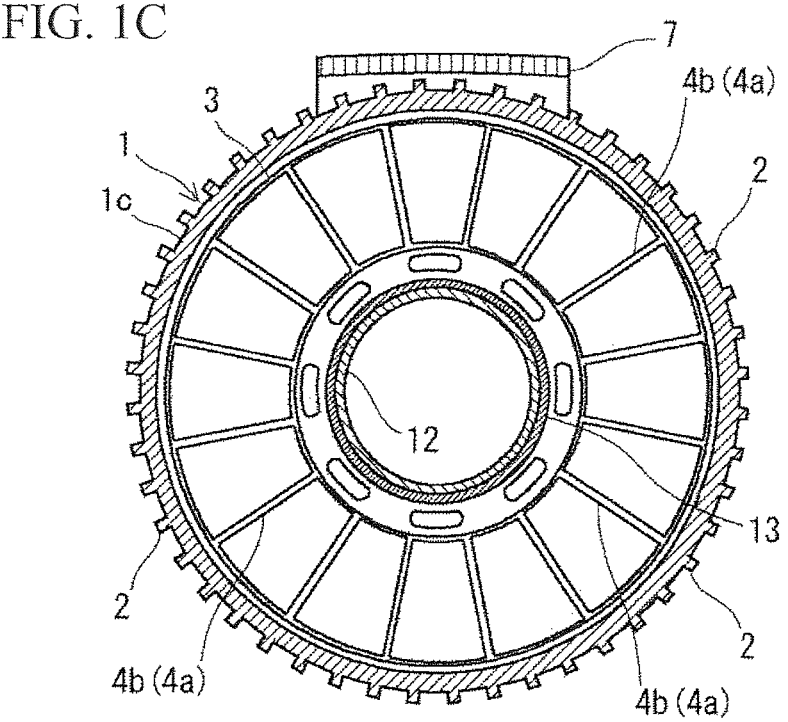
FIG. 1C is a diagram illustrating the same fluid-type retarding device, and is a diagram illustrating a cross section along IC-IC in FIG. 1A.
Figure 1D:
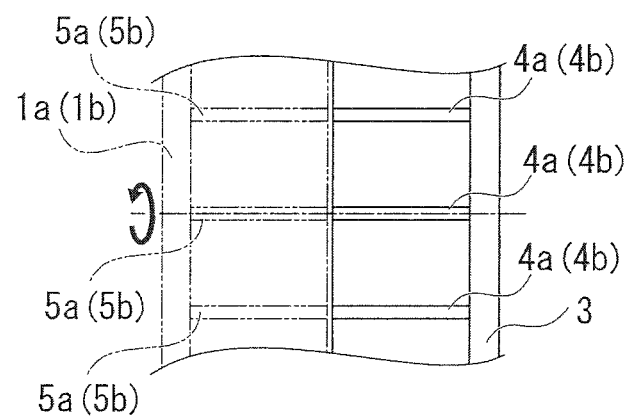
FIG. 1D is a schematic view illustrating a schematic configuration of disk vanes and housing vanes of the same fluid-type retarding device, and is an expanded view illustrating disk vanes and housing vanes when viewed from the outer peripheral side.
Figure 1E:
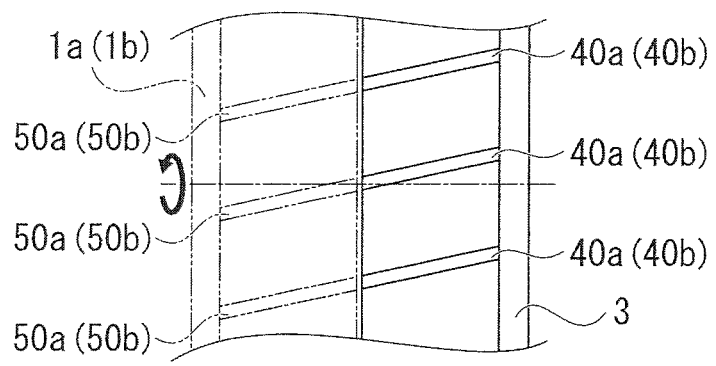
FIG. 1E is a schematic view illustrating a schematic configuration of disk vanes and housing vanes according to a modification example of the same fluid-type retarding device, and is an expanded view illustrating disk vanes and housing vanes when viewed from the outer peripheral side.

FIG. 1A is a schematic view illustrating the entire configuration of the fluid-type retarding device according to the first embodiment of the present invention. FIG. 1B is a diagram illustrating a cross section along IB-IB in FIG. 1A. FIG. 1C is a diagram illustrating a cross section along IC-IC in FIG. 1A. FIG. 1D is a schematic view illustrating a schematic configuration of disk vanes and housing vanes in the fluid-type retarding device according to the first embodiment, and is an expanded view illustrating disk vanes and housing vanes when viewed from the outer peripheral side. Furthermore, FIG. 1E is a schematic view illustrating a schematic configuration of disk vanes and housing vanes according to a modification example of the fluid-type retarding device according to the first embodiment, and is an expanded view illustrating disk vanes and housing vanes when viewed from the outer peripheral side.

As illustrated in FIG. 1A to FIG. 1D, the retarding device according to the first embodiment includes a rotating disk 3 and a rotating housing that surrounds the entire rotating disk 3.

In the first embodiment, the rotating disk 3 is configured so as to rotate integrally with a rotating shaft 11 such as a propeller shaft. More specifically, a tubular connecting shaft 12 is coaxially connected to the rotating shaft 11, for example, with a bolt, and the rotating disk 3 is connected to the connecting shaft 12 through a sleeve 13 press-fitted to this connecting shaft 12. With this configuration, the rotating disk 3 rotates integrally with the rotating shaft 11.

The rotating housing 1 is configured to be able to rotate with respect to the rotating shaft 11 while surrounding the rotating disk 3. More specifically, the rotating housing 1 includes paired disk portions 1a and 1b each having a doughnut shape provided at the front and the rear in the axial direction of the rotating shaft 11 so as to face both surfaces of the rotating disk 3, and a cylinder portion 1c that connects the outer circumference portions of the disk portions 1a and 1b and faces the outer peripheral surface of the rotating disk 3.

Each of the disk portions 1a and 1b is supported through bearings 15a and 15b with the sleeve 13 integrated with the rotating shaft 11. With this configuration, the rotating housing 1 can freely rotate with respect to the rotating shaft 11 in a state where the paired disk portions 1a and 1b and the cylinder portion 1c are combined with each other. In the example in FIG. 1A, a mode is illustrated in which the disk portion 1a on the front side is formed integrally with the cylinder portion 1c, and they are combined with the disk portion 1b on the rear side with a bolt, for example.

Here, in the first embodiment, in order to cause a space between both surfaces of the rotating disk 3 and the inner surface of each of the disk portions 1a and 1b to function as a working chamber for the working fluid, disk vanes 4a and 4b radially extending from the inner circumference to the outer periphery are provided on both surfaces of the rotating disk 3 facing the disk portions 1a and 1b (see FIG. 1A and FIG. 1C).

Similarly, in the rotating housing 1, housing vanes 5a and 5b corresponding to the disk vanes 4a and 4b on both surfaces of the rotating disk 3 and radially extending from the inner circumference to the outer periphery are provided on the inner surfaces of the disk portions 1a and 1b facing both surfaces of the rotating disk 3 (see FIG. 1A and FIG. 1B).

As illustrated in FIG. 1D, the disk vanes 4a, 4b and the housing vanes 5a, 5b are disposed so as to be paired at positions adjacent to each other at the front and the rear in the axial direction of the rotating shaft 11 in a manner such that they are used as fluid couplings. Then, the disk vanes 4a and 4b, and the housing vanes 5a and 5b each have a surface directed so as to be perpendicular to the rotational direction of each of the vanes. Areas lying across the circumferential direction are made between the disk vanes 4a, 4b and the housing vanes 5a, 5b, and four torus-shaped working chambers paired at the front and the rear therein.

In FIG. 1A, a mode is illustrated in which the disk vanes 4a and 4b are formed as impellers separately from the rotating disk 3, and are attached to the rotating disk 3. However, the disk vanes 4a and 4b may be formed integrally with the rotating disk 3. Similarly, a mode is illustrated in which the housing vanes 5a and 5b are formed as impellers separately from the disk portions 1a and 1b, and are attached to the disk portions 1a and 1b. However, the housing vanes 5a and 5b may be formed integrally with the disk portions 1a and 1b.

The rotating housing 1 is filled with (accommodates) working fluid (oil, water, or fluid obtained by combining them), not illustrated. This working fluid is prevented from leaking by ring-shaped seal members not illustrated and disposed adjacently to the bearings 15a and 15b supporting the disk portions 1a and 1b. With this configuration, the rotating housing 1, including the working chambers between the disk vanes 4a and 4b and the housing vanes 5a and 5b, is filled with the working fluid at all times.

The rotating housing 1 has an outer periphery provided with radiating fins 2 integrally formed with the cylinder portion 1c. Note that, in the disk portions 1a and 1b of the rotating housing 1, the radiating fins 2 may be provided in an area that does not interfere with formation of a friction member of a friction brake, which will be described later, for example, in an area of an inner circumference portion of an external surface. These radiating fins 2 function to cool the rotating housing 1, and cool the working fluid within the rotating housing 1.

The retarding device illustrated in FIG. 1A includes a friction brake that brings the rotating housing 1 to a stop at the time of braking. This friction brake includes: a brake caliper 7 that has brake pads 8a and 8b serving as friction members and squeezing the outer circumference portion of the rotating housing 1, in other words, the outer circumference portion of the external surface of each of the disk portions 1a and 1b; and an electrically driven direct-acting actuator 9 that drives this brake caliper 7.

The brake caliper 7 has the brake pads 8a and 8b paired at the front and the rear, and is pressed and supported by a bracket 17, for example, with a bolt provided with a spring, in a state where the rotating housing 1 is disposed between the brake pads 8a and 8b with a predetermined gap. This bracket 17 is attached to a non-rotating portion of the vehicle.

Furthermore, the bracket 17 is rotatably supported, through a bearing 18, with the sleeve 13 integrated with the rotating shaft 11. However, in the case of a retarding device mounted on the output side of a transmission of the vehicle, a transmission cover is supported through the bearing, and hence, the bracket 17 may be fixed to the transmission cover (non-rotating portion), and be supported without intervention of the bearing 18.

An actuator 9 is fixed to the brake caliper 7, for example, with a bolt. The actuator 9 is actuated, for example, with an electrically driven motor 10, and converts rotary motion by the electrically driven motor 10 to linear motion, thereby linearly moving the brake pad 8b on the rear side toward the disk portion 1b on the rear side.

With this movement, the brake pad 8b on the rear side presses the disk portion 1b on the rear side. Furthermore, with an effect of the resulting counterforce, the brake pad 8a on the front side moves toward the disk portion 1a on the front side. As a result, the rotating housing 1 is strongly squeezed by the brake pads 8a and 8b on the front and the rear sides.

With the retarding device according to the first embodiment having the configuration as described above, the friction brake is not activated during non-braking periods. At this time, as the rotating housing 1 is allowed to freely rotate with respect to the rotating shaft 11, the rotating disk 3 rotates integrally with the rotating shaft 11. In association with the rotation of the rotating disk 3, the disk vanes 4a and 4b and the housing vanes 5a and 5b function as fluid couplings, and the rotating housing 1 integrally rotates synchronously with the rotating disk 3. With this configuration, there occurs no difference in relative rotational speed between the disk vanes 4a and 4b and the housing vanes 5a and 5b, and hence, braking force does not occur.

On the other hand, at the time of braking, the friction brake is activated, and the rotating housing 1 is squeezed by the brake pads 8a and 8b serving as the friction members. With this operation, the rotating housing 1 stops rotating, and the brake member 1 is brought to a stop. If only the rotating housing 1 is brought to a stop when the rotating disk 3 is rotating, a difference in relative rotational speed takes place between the housing vanes 5a and 5b of the disk portions 1a and 1b (rotating housing 1) and the disk vanes 4a and 4b of the rotating disk 3. This causes the working fluid within the working chamber to circulate between the disk vanes 4a and 4b and the housing vanes 5a and 5b, which generates flow of circulation of the working fluid. At this time, the working fluid comes into collision with the disk vanes 4a and 4b, and serves as a resistance that prevents the rotating disk 3 from rotating integrally with the disk vanes 4a and 4b. This leads to a generation of braking force on the rotating disk 3, whereby it is possible to reduce the rotational speed of the rotating shaft 11 through the rotating disk 3.

At this time, kinetic energy of the rotating shaft 11 is converted into thermal energy in association of the generation of braking force, whereby temperatures of the working fluid increase. The heat given to this working fluid is transferred to the rotating housing 1, and is dissipated mainly through the radiating fins 2. Furthermore, the heat generated at the time of braking is accumulated to some degree in a form of an increase in temperatures of the working fluid and an increase in temperatures of the rotating housing 1. Then, by cancelling the activation of the friction brake during non-braking periods, the rotating housing 1 is made rotate at a high speed, thereby actively radiating the heat from the radiating fins 2.

According to the retarding device of the first embodiment, there is no need for the external heat exchanger for cooling the working fluid having high temperatures at the time of braking, and furthermore, there is no need for a special mechanism for supplying or discharging the working fluid to or from the working chamber or for a reservoir container for storing the working fluid. Thus, it is possible to achieve a simplified device configuration, the reduced weight, and the reduced size. Furthermore, the working chamber within the rotating housing 1 is always filled with the working fluid regardless of whether the device is in a time of switching from braking to non-braking and vice versa. Thus, it is not necessary to supply or discharge the working fluid to or from the working chamber, thereby exhibiting excellent responsivity in terms of switching.

Next, a modification example of the first embodiment will be described with reference to FIG. 1E.

FIG. 1E is a diagram illustrating a modification example of the first embodiment. Here, reference characters 40a, 40b, 50a, and 50b correspond to reference characters 4a, 4b, 5a, and 5b in FIG. 1A to FIG. 1D.

As illustrated in FIG. 1E, in the modification example of the first embodiment, a disk vane 40a, 40b and a housing vane 50a, 50b adjacent to each other are disposed at the front and the rear in the axial direction of the rotating shaft 11, and form a pair so as to be used as fluid couplings. Then, each disk vane 40a and 40b is made to slope toward the rear in the rotational direction as it approaches each of the housing vanes 50a, 50b from the rotating disk 3.

Furthermore, each housing vane 50a and 50b is sloped toward the rear in the rotational direction as it extends away from the disk vane 40a, 40b and it extends toward the inner surface side of the rotating housing 1. Configurations other than those described above are similar to those in the first embodiment, and hence, explanation thereof will not be repeated.

According to the modification example of the first embodiment having the configuration as described above, each of the disk vanes 40a and 40b is sloped toward the rear in the rotational direction with approach from the rotating disk 3 toward the housing vanes 50a and 50b, and each of the housing vanes 50a and 50b is sloped toward the rear in the rotational direction with distance from the disk vane 40a, 40b and with approach toward the inner surface side of the rotating housing 1, whereby it is possible to increase the braking force as compared with a case where they are not sloped.

Second Embodiment

Below, a fluid-type retarding device according to a second embodiment of the present invention will be described with reference to FIG. 2.

Figure 2:
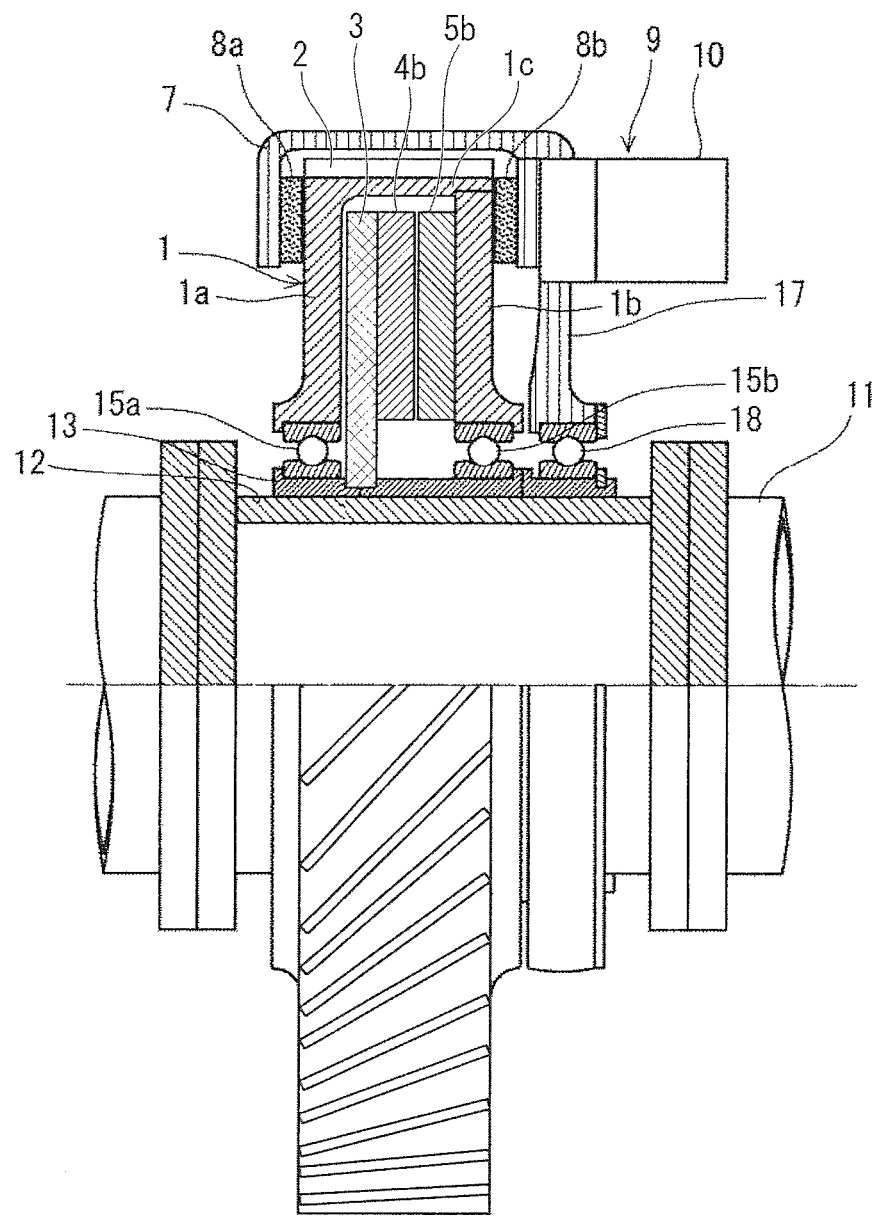
FIG. 2 is a schematic view illustrating the entire configuration of a fluid-type retarding device according to a second embodiment of the present invention, and is a side view in which part of the device is sectionally illustrated.

FIG. 2 is a schematic view illustrating the entire configuration of the fluid-type retarding device, which is the second embodiment of the present invention, and is a side view in which part of the device is sectionally illustrated. The retarding device according to the second embodiment is obtained by modifying the configuration of the retarding device according to the first embodiment, and is different from that in the first embodiment in the following points.

As illustrated in FIG. 2, the retarding device according to the second embodiment includes disk vanes 4b provided on one surface (rear side of the rotating shaft 11) of the rotating disk, and housing vanes 5b on the rear side provided to the disk portion 1b on the rear side of the rotating housing 1. Furthermore, the second embodiment has a configuration in which only one working chamber is disposed on the rear side of the rotating disk 3 in the axial direction of the rotating shaft 11. Configurations other than those described above are similar to those in the first embodiment. Hence, the same reference characters are attached, and explanation thereof will not be repeated. Note that it is optional whether the disk vanes and the housing vanes are formed in a direction perpendicular to the rotational direction as illustrated in FIG. 1D, or are formed in a direction sloped with respect to the rotational direction as illustrated in FIG. 1E.

With the second embodiment having the configuration as described above, only one working chamber is provided, and hence, it is possible to reduce the size of the rotating shaft 11 in the axial direction thereof.

Third Embodiment

Below, a fluid-type retarding device according to a third embodiment of the present invention will be described with reference to FIG. 3A to FIG. 3C.

Figure 3A:
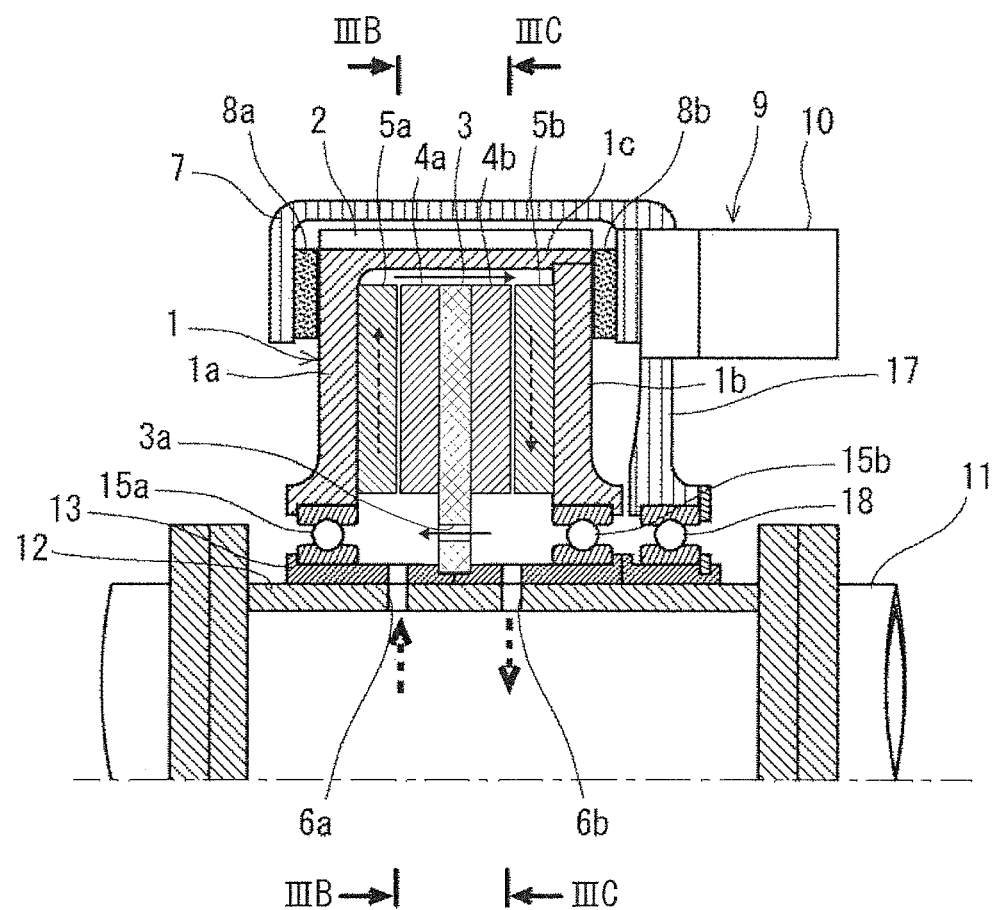
FIG. 3A is a schematic view illustrating the entire configuration of a fluid-type retarding device according to a third embodiment of the present invention, and is a side view in which part of the device is sectionally illustrated.

FIG. 3A is a schematic view illustrating the entire configuration of the fluid-type retarding device, which is the third embodiment of the present invention, and is a side view in which part of the device is sectionally illustrated. FIG. 3B is a diagram illustrating a cross section along IIIB-IIIB in FIG. 3A and FIG. 3C is a diagram illustrating a cross section along IIIC-IIIC in FIG. 3A. The retarding device according to the third embodiment is obtained by modifying the configuration of the retarding device according to the first embodiment, and is different from that in the first embodiment in the following points.

Figure 3B:
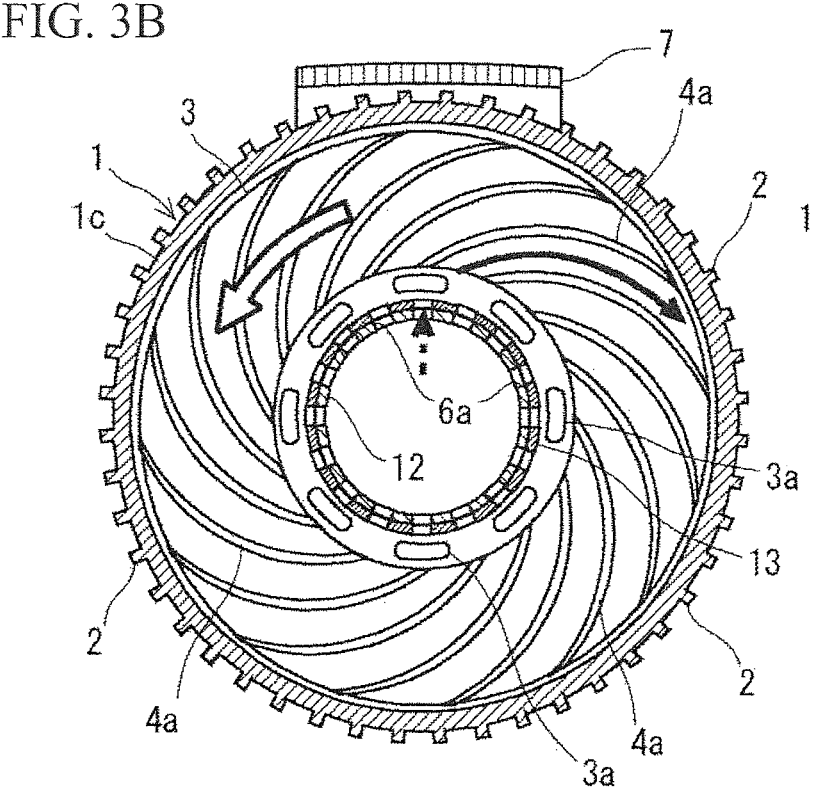
FIG. 3B is a diagram illustrating the same fluid-type retarding device, and is a diagram illustrating a cross section along IIIB-IIIB in FIG. 3A.

In the retarding device according to the third embodiment, of the disk vanes 4a and 4b formed on both surfaces of the rotating disk 3, each of the disk vanes 4a on the front side provided on the surface that faces the disk portion 1a on the front side of the rotating housing 1 extends in a spirally curved manner from the inner circumference to the outer periphery toward a direction opposite to the rotational direction (see the white arrow in FIG. 3B) of the rotating disk, as illustrated in FIG. 3A and FIG. 3B. On the other hand, as illustrated in FIG. 3A and FIG. 3C, each of the disk vanes 4b on the rear side provided on the surface that faces the disk portion 1b on the rear side of the rotating housing 1 extends in a spirally curved manner from the inner circumference to the outer periphery in the rotational direction (see the white arrow in FIG. 3C) of the rotating disk 3.

Furthermore, at an inner circumference portion of the rotating disk 3, plural through-holes 3a having an oval shape are provided over the circumferential direction.

Furthermore, the connecting shaft 12 connected integrally with the rotating shaft 11 is a tubular body having an internal space whose both ends are closed, and this internal space is filled with and accommodates the working fluid. For the connecting shaft 12 and the sleeve 13 press-fitted to the connecting shaft 12, plural communicating holes 6a and 6b that each connect the internal space of the rotating housing 1 and the internal space of the connecting shaft 12 are provided in the circumferential direction and are located on both sides of the rotating disk 3 and at the front and the rear of the connecting shaft 12 and the sleeve 13 in the axial direction of the rotating shaft 11.

With the retarding device according to the third embodiment having the configuration as described above, as the rotating disk 3 (disk vanes 4a and 4b) rotates integrally with the rotating shaft 11, the working fluid within the internal space on the front side of the rotating housing 1 is transferred from the inner circumferential side to the outer peripheral side by the disk vanes 4a on the front side, and the working fluid transferred to the outer peripheral side is transferred to the internal space on the rear side (see the right arrow with a solid line in FIG. 3A and FIG. 3B). At the same time, within the internal space on the rear side of the rotating housing 1, the working fluid is transferred from the outer peripheral side to the internal peripheral side by the disk vanes 4b on the rear side (see the downward arrow with a broken line in FIG. 3A and FIG. 3C). The working fluid transferred to the inner circumference side passes through the through-holes 3a at the inner circumference portion of the rotating disk 3, and is transferred to the internal space on the front side of the rotating housing 1 (see the left arrow with a solid line in FIG. 3A). As described above, the working fluid circulates around the rotating disk 3 within the rotating housing 1.

Figure 3C:
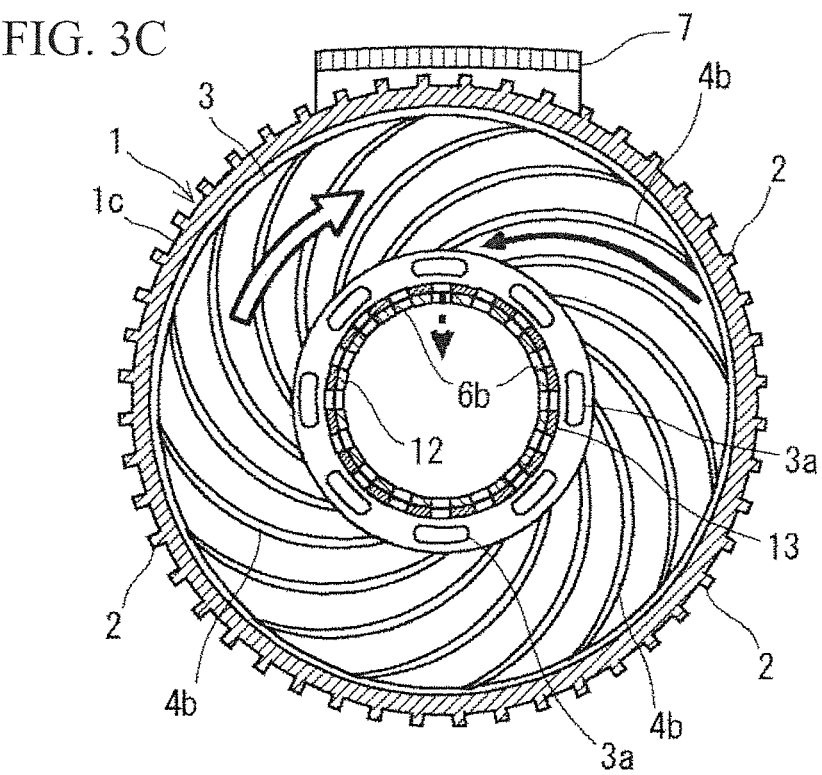
FIG. 3C is a diagram illustrating the same fluid-type retarding device, and is a diagram illustrating a cross section along IIIC-IIIC in FIG. 3A.

Furthermore, in the third embodiment, part of the working fluid transferred to the inner circumferential side by the disk vanes 4b on the rear side passes through the communicating holes 6b on the rear side that open to the inner circumference, and is transferred to the inside of the connecting shaft 12 (rotating shaft 11) (see the arrow with a dotted line in FIG. 3A and FIG. 3C). The working fluid transferred to the inside of the connecting shaft 12 passes through the communicating hole 6a on the front side, and is transferred to the internal space on the front side of the rotating housing 1 (see the arrow with a dotted line in FIG. 3A and FIG. 3B). As described above, it is possible to make the internal space of the connecting shaft 12 (rotating shaft 11) function as a reservoir tank for the working fluid, and the working fluid within the rotating housing 1 circulates throughout the space including through the internal space of the connecting shaft 12 thereof.

Thus, the retarding device according to the third embodiment also achieves a similar effect obtained by the first embodiment.

With the third embodiment, the working fluid within the rotating housing 1 entirely circulates, and hence, it is possible to prevent temperatures of the working fluid from locally rising. Furthermore, it is possible to utilize the internal space of the connecting shaft 12 (rotating shaft 11) as the reservoir tank. Thus, the thermal capacity of the working fluid increases according to the volume of the internal space of the connecting shaft 12, and hence, it is possible to prevent temperatures of the working fluid from excessively rising in a short period of time. As a result, it is possible to sufficiently maintain the duration of braking.

It should be noted that it may be possible to exchange the positions of the disk vanes 4a and 4b from front to rear and vice versa.

Fourth Embodiment

Below, a fluid-type retarding device according to a fourth embodiment of the present invention will be described with reference to FIG. 4A and FIG. 4B.

Figure 4A:
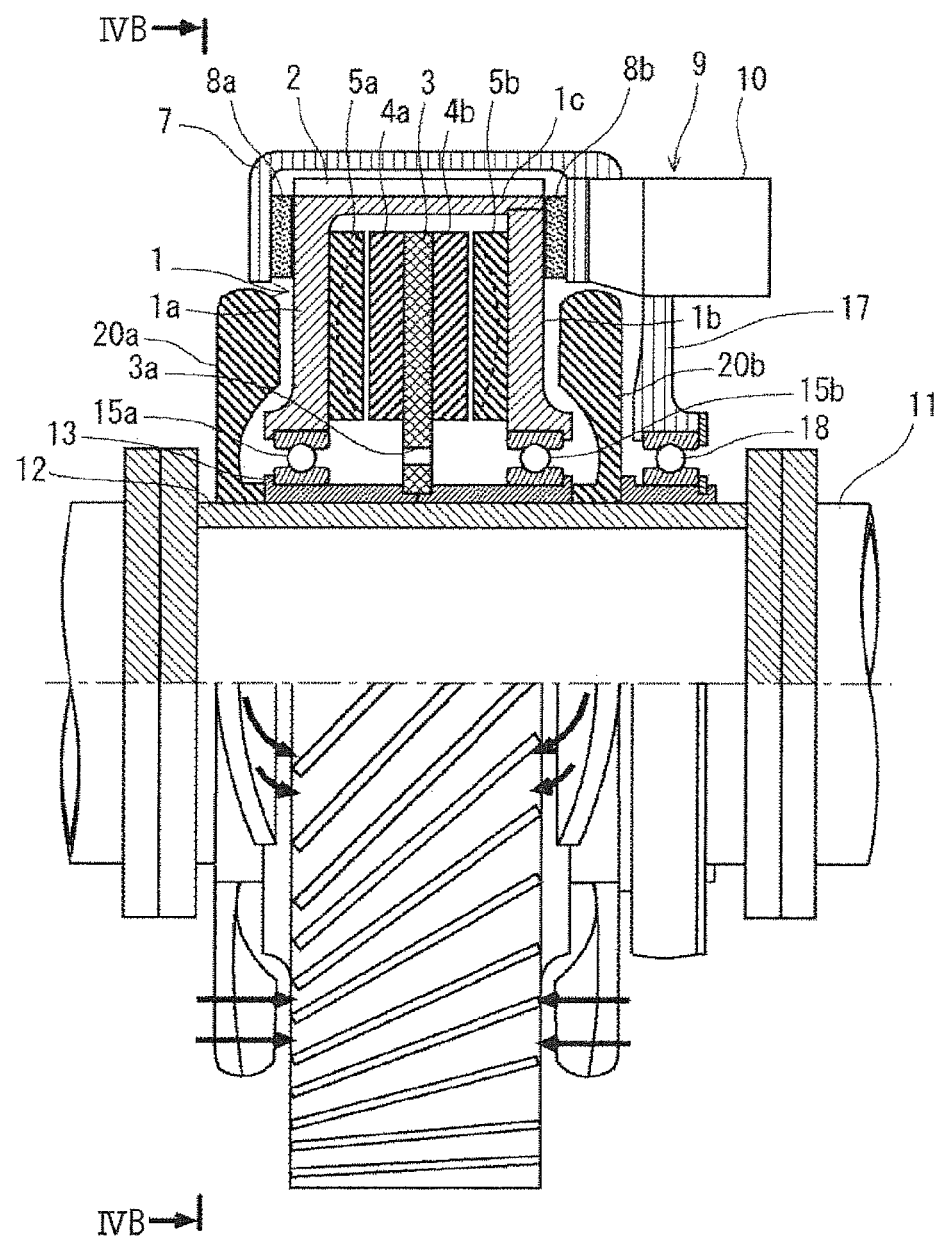
FIG. 4A is a schematic view illustrating the entire configuration of a fluid-type retarding device according to a fourth embodiment of the present invention, and is a side view in which part of the device is sectionally illustrated.
Figure 4B:
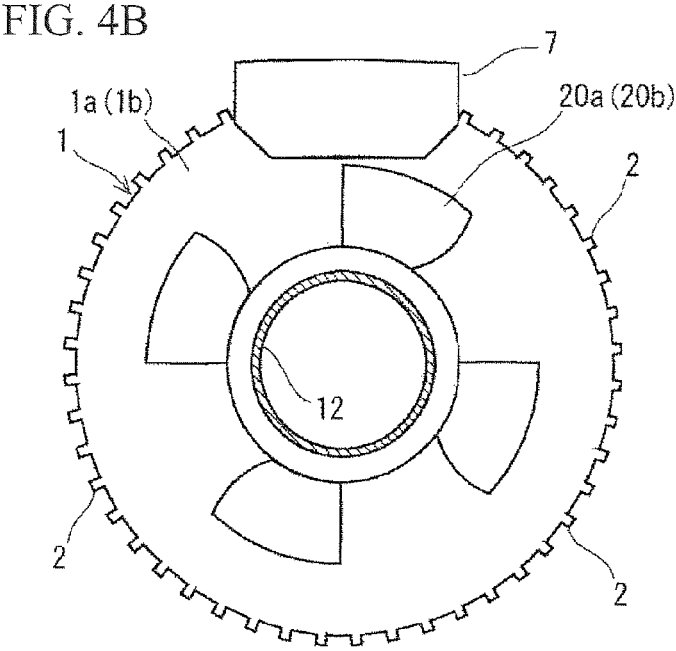
FIG. 4B is a diagram illustrating the same fluid-type retarding device, and is a diagram illustrating a cross section along IVB-IVB in FIG. 4A.

FIG. 4A is a schematic view illustrating the entire configuration of the fluid-type retarding device, which is the fourth embodiment of the present invention, and is a side view in which part of the device is sectionally illustrated. FIG. 4B is a diagram illustrating a cross section along IVB-IVB in FIG. 4A. The retarding device according to the fourth embodiment is obtained by modifying the configuration of the retarding device according to the first embodiment.

At the time of actual braking, the rotating housing 1 is heated due to slide with the friction member of the friction brake. The heat generated in the rotating housing 1 is radiated mainly from the radiating fins 2 as described above. However, at the time of braking, the rotating housing 1 is not moving, and hence, the cooling function of the radiating fins 2 works less effectively than when the rotating housing 1 rotates synchronously with the rotating disk 3 such as during non-braking periods. If the cooling function of the radiating fins 2 does not work sufficiently, there is a possibility that the working fluid within the rotating housing 1 is not sufficiently cooled. Thus, it is desirable to contrive to suppress the increase in temperatures of the rotating housing 1.

The retarding device according to the fourth embodiment is obtained by focusing on this point. More specifically, as illustrated in FIG. 4A and FIG. 4B, the retarding device according to the fourth embodiment includes impellers 20a and 20b disposed next to the external surface of each of the paired disk portions 1a and 1b constituting the rotating housing 1. Each of the impellers 20a and 20b is press-fitted and fixed to the connecting shaft 12 connected integrally with the rotating shaft 11.

With the retarding device according to the fourth embodiment having the configuration as described above, even if the rotational speed of the rotating shaft 11 reduces during braking, the impellers 20a and 20b rotate if the rotating shaft 11 rotates. Thus, it is possible to blow air from the impellers 20a and 20b toward the rotating housing 1 that is at rest (see the arrows with a solid line in FIG. 4A). This makes it possible to forcibly cool the rotating housing 1, and prevent the temperatures of the rotating housing 1 from rising.

It should be noted that the impellers 20a and 20b as described above are applicable not only to the retarding device according to the first embodiment but also to the retarding devices according to the second and the third embodiments.

Fifth Embodiment

Below, a fluid-type retarding device according to a fifth embodiment of the present invention will be described with reference to FIG. 5.

Figure 5:
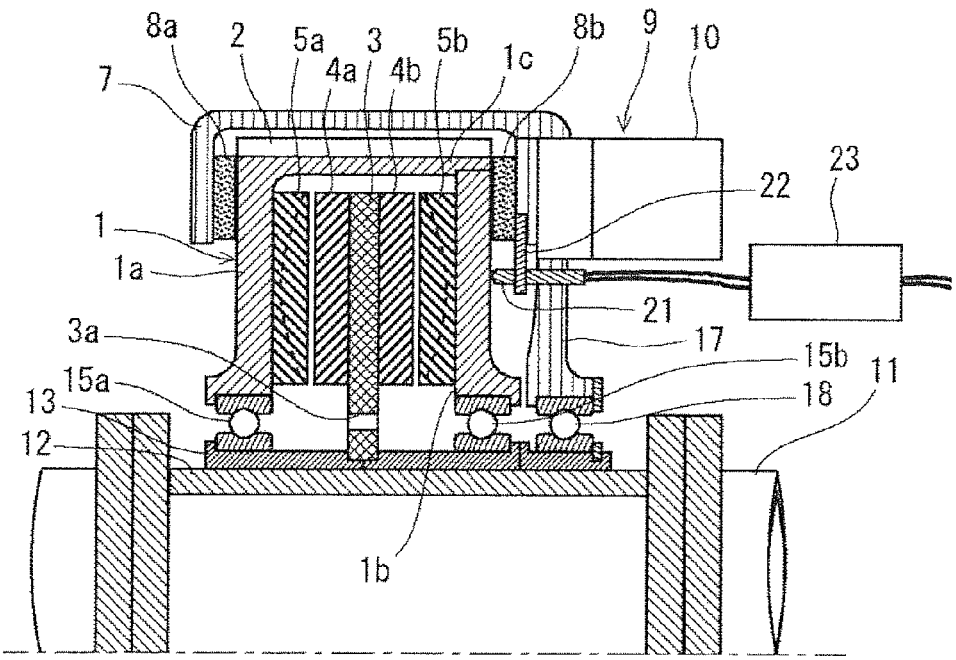
FIG. 5 is a schematic view illustrating the entire configuration of a fluid-type retarding device according to a fifth embodiment of the present invention.

FIG. 5 is a schematic view illustrating the entire configuration of the fluid-type retarding device, which is the fifth embodiment of the present invention, and is a side view in which part of the device is sectionally illustrated. As in fourth embodiment, the retarding device according to the fifth embodiment is obtained by focusing on suppressing the increase in temperatures of the rotating housing 1, and by modifying the configuration of the retarding device according to the first embodiment.

More specifically, as illustrated in FIG. 5, the retarding device according to the fifth embodiment includes a sheathed temperature sensor 21. This temperature sensor 21 is connected with a temperature sensor holder 22 that moves in association with either one of the brake pads 8a and 8b paired at the front and the rear and serving as the friction member of the friction brake, for example, in association with the brake pad 8b on the rear side. Here, the temperature sensor 21 is connected with the temperature sensor holder 22, and at the time of braking, the top end of the sheath of the temperature sensor 21 is brought into contact with the external surface of the disk portion 1b in association with movement of the brake pad 8b on the rear side toward the disk portion 1b on the rear side. Furthermore, the temperature sensor 21 is connected with an actuator controlling unit 23 that controls actuation of the actuator 9 of the friction brake.

With the retarding device according to the fifth embodiment having the configuration as described above, during braking periods, the top end of the sheath of the temperature sensor 21 is brought into contact with the disk portion 1b (rotating housing 1) on the rear side, and continuously detects temperatures of the disk portion 1b. At this time, the actuator controlling unit 23 monitors temperatures of the disk portion 1b detected by the temperature sensor 21, and stops actuating the actuator 9 if the temperature exceeds a predetermined temperature. Once the actuation of the actuator 9 is stopped, the brake pads 8a and 8b and the temperature sensor 21 move away from the disk portion 1b, and are switched into a non-braking state. As a result, the rotating housing 1 rotates together with the rotating shaft 11, and the rotating housing 1 is cooled with the radiating fins 2. Then, the actuator controlling unit 23 actuates the actuator 9 again after a predetermined period of time elapses after actuation of the actuator 9 is stopped, to brake the brake member 1. With the operations described above, it is possible to suppress the increase in temperatures of the rotating housing 1.

The predetermined temperature for the actuator 9 to stop activating and the predetermined period of time for the actuator 9 to restart actuating are set as appropriate according to materials or shapes or dimensions of the rotating housing 1 or the upper temperature limit of the fluid, and are set in advance in the actuator controlling unit 23. For example, the predetermined temperature is set in the range of approximately 170 to 180° C., and the predetermined period of time is set in the range of approximately 5 to 10 seconds.

It should be noted that the temperature sensor 21 as described above may be configured to move integrally with the brake pad 8a on the front side. Furthermore, the temperature sensor 21 is applicable not only to the retarding device according to the first embodiment but also to the retarding devices according to the second to the fourth embodiments.

Sixth Embodiment

Below, a fluid-type retarding device according to a sixth embodiment of the present invention will be described with reference to FIG. 6.

Figure 6:
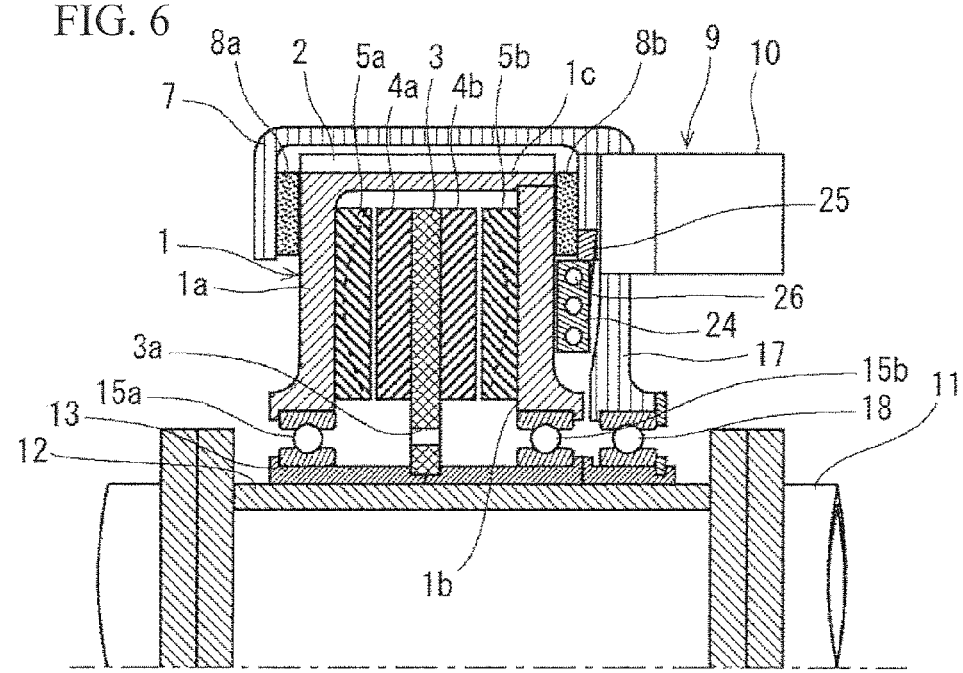
FIG. 6 is a schematic view illustrating the entire configuration of a fluid-type retarding device according to a sixth embodiment of the present invention.

FIG. 6 is a schematic view illustrating the entire configuration of the fluid-type retarding device, which is the sixth embodiment of the present invention, and is a side view in which part of the device is sectionally illustrated. As in the fourth embodiment, the retarding device according to the sixth embodiment is obtained by focusing on suppressing the increase in temperatures of the rotating housing 1, and by modifying the configuration of the retarding device according to the first embodiment.

More specifically, as illustrated in FIG. 6, the retarding device according to the sixth embodiment includes a water cooling body (cooling member) 24. This water cooling body 24 is connected with a water-cooling-body holder 25 that moves integrally with either one of the brake pads 8a and 8b paired at the front and the rear and serving as the friction member of the friction brake, for example, moves integrally with the brake pad 8b on the rear side. Furthermore, at the time of braking, the water cooling body 24 is brought into contact with the external surface of the disk portion 1b in association with movement of the brake pad 8b on the rear side toward the disk portion 1b on the rear side of the rotating housing 1.

Furthermore, a water passage 26 is formed within the water cooling body 24, and has an inlet port and an outlet port each connected with pipes, not illustrated. These pipes are connected with a cooling water system (for example, a radiator) of the vehicle, and cooling water circulates through the water passage 26 within the water cooling body 24, whereby low temperatures are maintained at all times.

With the retarding device according to the sixth embodiment having the configuration as described above, at the time of braking, the water cooling body 24 is brought into contact with the disk portion 1b on the rear side (rotating housing 1). Thus, the disk portion 1b is forcibly cooled through heat exchange with the water cooling body 24. As described above, it is possible to prevent the increase in temperatures of the rotating housing 1.

It should be noted that the water cooling body 24 as described above may be configured to move integrally with the brake pad 8a on the front side. Furthermore, the water cooling body 24 is applicable not only to the retarding device according to the first embodiment but also to the retarding devices according to the second to the fifth embodiments. Note that, instead of the water cooling body 24, a cooling member in which cooling oil and the like flows may be used.

Seventh Embodiment

Below, a fluid-type retarding device according to a seventh embodiment of the present invention will be described with reference to FIG. 7A and FIG. 7B.

Figure 7A:
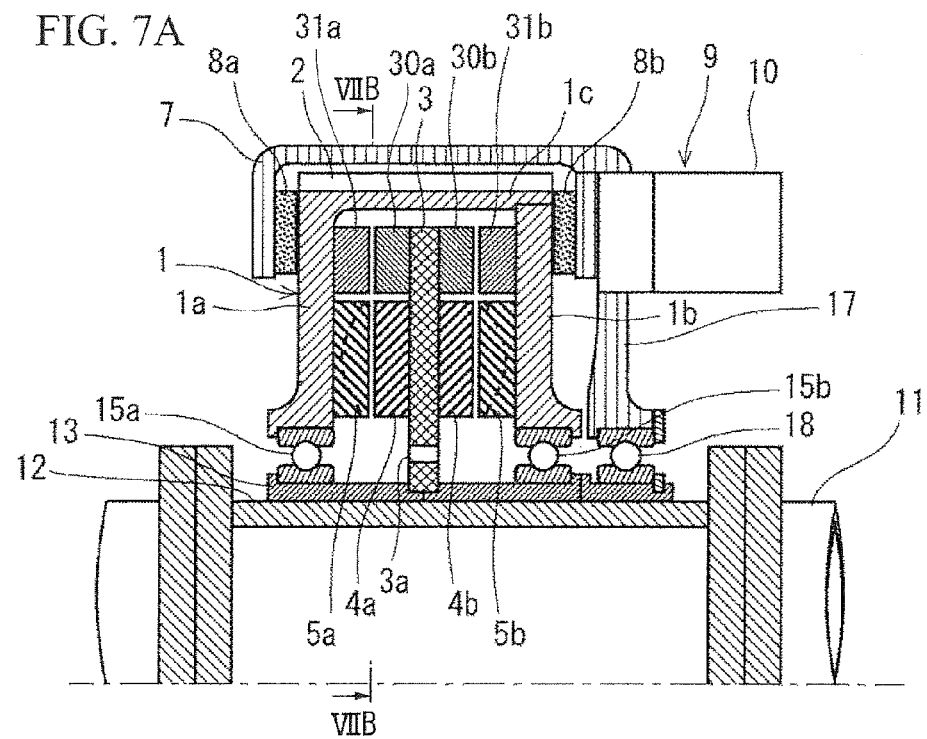
FIG. 7A is a schematic view illustrating the entire configuration of a fluid-type retarding device according to a seventh embodiment of the present invention.
Figure 7B:
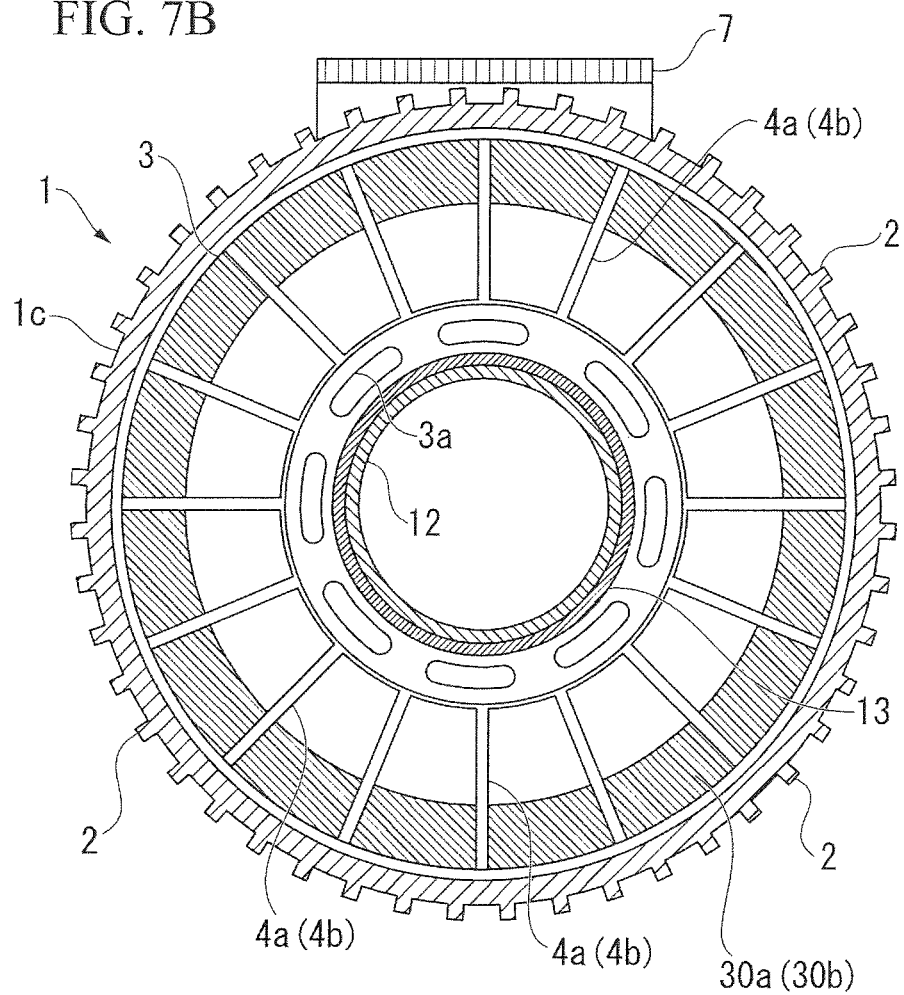
FIG. 7B is a diagram illustrating the same fluid-type retarding device, and is a diagram illustrating a cross section along VIIB-VIIB in FIG. 7A.

FIG. 7A is a schematic view illustrating the entire configuration of the fluid-type retarding device, which is the seventh embodiment of the present invention, and FIG. 7B is a diagram illustrating a cross section along VIIB-VIIB in FIG. 7A. The retarding device according to the seventh embodiment is obtained by modifying the configuration of the retarding device according to the first embodiment, and adding an element of an eddy-current retarding device.

More specifically, as illustrated in FIG. 7A and FIG. 7B, the retarding device according to the seventh embodiment has the following configuration in order to obtain braking force using fluid resistance of the working fluid, and at the same time, obtain braking force using eddy current occurring due to an effect of a magnetic field. For example, the disk vanes 4a and 4b are provided only to an inner circumference portion of the rotating disk 3, and the housing vanes 5a and 5b paired with the disk vanes 4a and 4b are provided only to an inner circumference portion of the disk portions 1a and 1b.

Plural permanent magnets 30a and 30b are arranged circumferentially on outer circumference portions of both surfaces of the rotating disk 3. The permanent magnets 30a and 30b are arranged in a manner such that magnetic poles (north pole and south pole) are directed to an axial direction of the rotating shaft 11, in other words, are directed to an axial direction of the rotating disk 3, and different magnetic poles are alternately arranged in the circumferential direction.

Furthermore, disk-shaped brake members (eddy-current generating portions) 31a and 31b having a doughnut shape and paired with the permanent magnets 30a and 30b are arranged on an outer circumference portion of an inner surface of each of the disk portions 1a and 1b facing the permanent magnets 30a and 30b. Each of the brake members 31a and 31b is formed with an electrically conductive material, which includes a ferromagnetic material such iron, a soft magnetic material such as ferritic stainless steel, and a non-magnetic material such as aluminum alloy and copper alloy. Furthermore, it is more preferable that the surface layer portion of the inner surface of each of the brake members 31a and 31b facing the permanent magnets 30a and 30b is made out of a highly electrically conductive material such as copper and copper alloy.

With the retarding device according to the seventh embodiment having the configuration as described above, during non-braking periods, the rotating housing 1 can freely rotate with respect to the rotating shaft 11. Thus, in association with the rotating disk 3 rotating integrally with the rotating shaft 11, the disk vanes 4a and 4b and the housing vanes 5a and 5b function as fluid couplings. At the same time, the brake members 31a and 31b of the rotating housing 1 receive a magnetic attraction force (in the case where the brake member is made out of a magnetic material) of the permanent magnets 30a and 30b held by the rotating disk 3, or the Lorentz force (in the case where the brake member is made out of a non-magnetic material) due to an effect of the magnetic field. For these reasons, the rotating housing 1 integrally rotates synchronously with the rotating disk 3. In this case, no difference in relative rotational speed substantially takes place between the disk vanes 4a and 4b and the housing vanes 5a and 5b, as well as between the permanent magnets 30a and 30b and the brake members 31a and 31b, and hence, braking force does not occur.

Here, in the case where the brake members 31a and 31b are made out of a non-magnetic material, no magnetic attraction force acts between the magnets 30a and 30b and the brake members 31a and 31b. However, as the magnets 30a and 30b rotate and move while causing the magnetic filed on the brake members 31a and 31b, the braking force occurs on the brake members 31a and 31b due to the effect of the magnetic field, and hence, the brake members 31a and 31b rotate in the same direction as the magnets 30a and 30b. More specifically, the rotating housing 1 rotates in the same direction as the rotating disk 3 with a slightly different relative rotational speed so as to maintain a balance between the braking force generated as a result of the difference in relative rotational speed between the brake members 31a and 31b and the magnets 30a and 30b, and a loss occurring at a bearing portion due to rotation of the rotating housing 1 or drag force related to air resistance caused by rotation of the rotating housing 1. In other words, in the case where the brake members 31a and 31b are made out of a non-magnetic material, the rotating housing 1 does not rotate in a fully synchronized manner with the rotating disk 3 but substantially synchronously rotates with a slight difference in rotational speed, whereby non-braking state is maintained.

On the other hand, at the time of braking, only the rotating housing 1 is brought to a stop with actuation of the friction brake. Once only the rotating housing 1 is brought to a stop, a difference in relative rotational speed takes places between the disk vanes 4a and 4b and the housing vanes 5a and 5b. This leads to a generation of circulation flow of the working fluid in the working chamber, and a fluid resistance that prevents the rotation of the rotating disk 3 (disk vanes 4a and 4b) takes places, whereby it is possible to obtain the braking force. At the same time, there occurs a difference in relative rotational speed between the permanent magnets 30a and 30b and the brake members 31a and 31b, so that eddy current is generated on the inner surfaces of the brake members 31a and 31b. Then, braking force in a direction opposite to the rotational direction of the rotating disk 3 rotating takes place in accordance with the Fleming's left-hand rule based on the synergistic effect between the eddy current generated on the inner surfaces of the brake members 31a and 31b and the magnetic flux density from the permanent magnets 30a and 30b. As described above, by utilizing the eddy current generated with the effect of the magnetic field from the permanent magnets 30a and 30b in addition to the fluid resistance of the working fluid, it is possible to effectively obtain the braking force.

It should be noted that, as for the arrangement of the permanent magnets 30a and 30b paired with the brake members 31a and 31b, and the arrangement of the disk vanes 4a and 4b paired with the housing vanes 5a and 5b, it may be possible to interchange the outer circumference portion side with the inner circumference portion side. Further more, as for the arrangement of the permanent magnets 30a and 30b and the brake members 31a and 31b, it may be possible to interchange the rotating disk 3 side with the rotating housing 1 side as long as they form a pair. Furthermore, the permanent magnets 30a and 30b and the brake members 31a and 31b described above are applicable not only to the retarding devices according to the first embodiment but also to the retarding device according to the second to the sixth embodiments.

Although the retarding device according to the seventh embodiment includes the permanent magnets 30a and 30b, the amount thereof is smaller than that in a regular eddy-current retarding device. Thus, it is possible to reduce cost of the permanent magnets 30a and 30b, and achieve stabilization. Furthermore, although the brake members 31a and 31b are heated due to eddy current generated on the brake members 31a and 31b, the heat is transferred to the rotating housing 1, and is radiated through the radiating fins 2. Thus it is possible to efficiently suppress the increase in temperatures of the brake members 31a and 31b due to the heat generation.

It should be noted that the present invention is not limited to each of the embodiments described above, and various modifications thereto are possible without departing from the scope of the present invention.

For example, in each of the embodiments described above, descriptions have been made of the case where disk vanes 4a and 4b are formed on surfaces on both sides of the rotating disk 3. For example, it may be possible to employ a configuration in which the disk vanes are formed on one surface of the rotating disk 3. Furthermore, it may be possible to employ a configuration in which the permanent magnets 30a and 30b are arranged only on one surface of the rotating disk 3. Note that, in the case where the disk vanes are formed only on one surface of the rotating disk 3, it is preferable not to form the through-holes 3a described above.

Furthermore, in the third embodiment described above, descriptions have been made of the case where the communicating holes 6a and 6b that allow the internal space of the rotating housing 1 and the internal space of the connecting shaft 12 to communicate with each other are formed. However, it is optional as to whether to make the internal space of the rotating housing 1 and the internal space of the connecting shaft 12 communicable to each other.

Furthermore, it may be possible to employ a configuration in which thermal treatment or surface treatment is applied to the outer circumference portions of the external surfaces of the disk portion 1a and 1b (rotating housing 1) against which the friction members 8a and 8b are pressed at the time of braking, thereby increasing the surface hardness thereof, or a steel sheet having excellent wear resistance is attached on these outer circumference portions, thereby reducing the amount of wear. In the case where the rotating housing 1 is made out of aluminum alloy, it may be possible to apply an anodic oxide coating process to improve the wear resistance.

Furthermore, it is optional as to whether to provide the impellers 20a and 20b connected to the rotating shaft 11, the actuator 9 that moves the paired brake pads 8a and 8b toward the disk portions 1a and 1b, the actuator controlling unit that stops actuating the actuator 9 in the case where temperatures of the disk portions 1a and 1b exceed a predetermined temperature, and the cooling member (for example, the water cooling body 24) that is brought into contact with the external surface of each of the disk portions 1a and 1b.

Furthermore, in the sixth embodiment described above, descriptions have been made of the case where the permanent magnets 30a and 30b are disposed on surfaces on both sides of the rotating disk 3, and the eddy-current generating portions 31a and 31b are disposed on inner surfaces of both sides of the disk portions 1a and 1b. However, it is possible to optionally determine whether the permanent magnets are arranged on the surface of the rotating disk 4 perpendicular to the rotating shaft 11 or on the outer peripheral surface of the rotating disk 4. Furthermore, instead of the permanent magnets, it may be possible to form an eddy-current generating portion.

Furthermore, in the case where the permanent magnets or the eddy-current generating portion is formed on a surface of the rotating disk 3 facing each of the disk portions 1a and 1b, it may be possible to form the permanent magnets or the eddy-current generating portion on the inner circumferential side of the disk vanes 4a and 4b.

Furthermore, as for the friction brake that brings the brake member to a stop at the time of braking, it may be possible to use not only a friction brake that employs the electrically driven direct-acting actuator as a driving source to press the brake pads against the external surface of the brake member (disk portion) but also a friction brake that employs an electromagnetic clutch mechanism with electromagnets to press a clutch plate serving as the friction member against the external surface of the brake member, or a configuration that employs a drum brake mechanism and presses brake shoes serving as the friction member against the outer peripheral surface of the brake member (cylinder portion).

INDUSTRIAL APPLICABILITY

According to the fluid-type retarding device of the present invention, it is possible to provide a fluid-type retarding device that can achieve the reduced weight and the reduced size by simplifying the device configuration and reducing the size in the axial direction of the rotating shaft to be connected.

BRIEF DESCRIPTION OF THE REFERENCE SYMBOLS

1: rotating housing
1a, 1b: disk portion
1c: cylinder portion
2: radiating fin
3: rotating disk
3a: through-hole
4a, 4b, 40a, 40b: vane (disk vane)
5a, 5b, 50a, 50b: vane (housing vane)
6a, 6b: communicating hole
7: brake caliper
8a, 8b: brake pad
9: electrically driven direct-acting actuator
10: electrically driven motor
11: rotating shaft
12: connecting shaft
13: sleeve
15a, 15b: bearing
17: bracket
18: bearing
20a, 20b: impeller
21: temperature sensor
22: temperature sensor holder
23: actuator controlling unit
24: water cooling body (cooling member)
25: water-cooling-body holder
26: water passage
30a, 30b: permanent magnet
31a, 31b: brake member (eddy-current generating portion)

The invention claimed is:

1. A retarding device using a fluid, comprising:
a rotating disk provided to a rotating shaft;
a rotating housing that includes paired disk portions and a cylinder portion connecting outer circumferential portions of the disk portions so as to surround the rotating disk, and is rotatably supported with the rotating shaft; and
a friction brake that presses a friction member against the rotating housing at a time of braking to bring the rotating housing to a stop, wherein
on at least one surface of the rotating disk, a disk vane extending from an inner circumference of the surface toward an outer peripheral side is formed,
on an inner surface of each of the paired disk portions corresponding to the disk vane, a housing vane extending from an inner circumference to an outer periphery is formed,
working fluid is accommodated within the rotating housing; and
the rotating shaft supporting the rotating housing has a tubular body having a space accommodating the working fluid therein, and includes a communicating hole that allows an internal space of the rotating housing and an internal space of the rotating shaft to communicate with each other.

2. The retarding device according to claim 1, wherein the disk vane is formed on both sides of the rotating disk, and
a through-hole is provided on an inner circumference portion of the rotating disk.

3. The retarding device according to claim 1, wherein the disk vane is formed on both sides of the rotating disk; and
an outer peripheral side of the disk vane formed on one surface of the rotating disk is formed so as to extend toward the rear in a rotational direction of the rotating disk, and an outer peripheral side of the disk vane formed on the other surface is formed so as to extend toward the front in the rotational direction of the rotating disk.

4. The retarding device according to claim 1, further comprising:
an impeller provided to the rotating shaft so as to be proximate to an external surface of each of the paired disk portions.

5. The retarding device according to claim 1, wherein the friction brake includes:

a brake caliper that is fixed to a non-rotating portion of a vehicle provided with the rotating shaft and includes paired brake pads that each serve as the friction member and squeeze the paired disk portions; and an actuator that drives the brake caliper and moves the paired brake pads toward the disk portions.

6. The retarding device according to claim 5, further comprising:

a temperature sensor that is brought into contact with an external surface of each of the disk portions in association with movement of the brake pads toward the disk portions, and detects a temperature of each of the disk portions; and an actuator controlling unit that stops actuating the actuator in a case where the temperature of the disk portion detected by the temperature sensor exceeds a predetermined temperature.

7. The retarding device according to claim 5, further comprising:

a cooling member that is brought into contact with an external surface of each of the disk portions in association with movement of the brake pads toward the disk portions.

8. The retarding device according to claim 1, wherein either one of a plurality of permanent magnets and an eddy-current generating member is formed on at least any one surface of both surfaces and an outer peripheral surface of the rotating disk;

an eddy-current generating member is formed on a surface selected from among inner surfaces of the disk portions and an inner peripheral surface of the cylinder portion, each of which constitutes the rotating housing, this selected surface corresponding to the surface of the rotating disk having the plurality of permanent magnets formed thereon;

a plurality of permanent magnets are formed on a surface corresponding to the surface of the rotating disk having the eddy-current generating member formed thereon; and the plurality of permanent magnets are arranged in a manner such that opposing magnetic poles are alternately arranged in a circumferential direction of the rotating disk.

* * * * *